United States Patent
Lee et al.

(10) Patent No.: US 8,117,026 B2
(45) Date of Patent: Feb. 14, 2012

(54) STRING MATCHING METHOD AND SYSTEM USING PHONETIC SYMBOLS AND COMPUTER-READABLE RECORDING MEDIUM STORING COMPUTER PROGRAM FOR EXECUTING THE STRING MATCHING METHOD

(75) Inventors: Kyung-eun Lee, Suwon-si (KR); Seok-joong Kang, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 948 days.

(21) Appl. No.: 11/636,634

(22) Filed: Dec. 11, 2006

(65) Prior Publication Data

US 2007/0156404 A1    Jul. 5, 2007

(30) Foreign Application Priority Data

Jan. 2, 2006   (KR) ........................ 10-2006-0000161

(51) Int. Cl.
*G10L 15/00* (2006.01)
*G06F 19/00* (2011.01)

(52) U.S. Cl. .............................. 704/10; 704/9; 704/231

(58) Field of Classification Search .................. 704/9, 10
See application file for complete search history.

(56) References Cited

U.S. PATENT DOCUMENTS

| | | | |
|---|---|---|---|
| 5,956,739 A * | 9/1999 | Golding et al. ............... | 715/209 |
| 6,144,958 A | 11/2000 | Ortega et al. | |
| 6,292,768 B1 | 9/2001 | Chan | |
| 6,794,566 B2 | 9/2004 | Pachet | |
| 6,864,809 B2 | 3/2005 | O'dell et al. | |
| 6,950,792 B1 | 9/2005 | Nussbaum | |
| 6,990,449 B2 * | 1/2006 | Case ............................. | 704/260 |
| 6,990,451 B2 * | 1/2006 | Case et al. .................... | 704/260 |
| 7,177,795 B1 * | 2/2007 | Chen et al. ........................ | 704/9 |
| 7,292,971 B2 | 11/2007 | Su | |
| 7,451,087 B2 * | 11/2008 | Case et al. .................... | 704/267 |
| 7,542,973 B2 * | 6/2009 | Segal et al. ....................... | 707/6 |
| 7,587,306 B2 | 9/2009 | Teytaud | |
| 2001/0001877 A1 * | 5/2001 | French et al. .................. | 713/182 |
| 2002/0128813 A1 | 9/2002 | Engelsberg et al. | |
| 2002/0156816 A1 * | 10/2002 | Kantrowitz et al. .......... | 707/530 |
| 2003/0040909 A1 | 2/2003 | Ghali | |
| 2003/0074185 A1 | 4/2003 | Kang | |
| 2003/0187649 A1 * | 10/2003 | Logan et al. .................... | 704/260 |
| 2004/0006469 A1 * | 1/2004 | Kang ............................. | 704/254 |
| 2004/0024760 A1 * | 2/2004 | Toner et al. ....................... | 707/6 |

(Continued)

FOREIGN PATENT DOCUMENTS

JP    2001-067364 A    3/2001

(Continued)

OTHER PUBLICATIONS

Non Final Office Action issued Jan. 20, 2010 in U.S. Appl. No. 11/453,597.

(Continued)

*Primary Examiner* — Justin Rider
(74) *Attorney, Agent, or Firm* — Sughrue Mion, PLLC

(57) ABSTRACT

A string matching method and system for searching for a representative string for a plurality of strings which are written in different languages and/or in different ways but share the substantially same meaning, and a computer-readable recording medium storing a computer program for executing the string matching method are provided.

31 Claims, 9 Drawing Sheets

U.S. PATENT DOCUMENTS

| | | | |
|---|---|---|---|
| 2004/0252604 A1 | 12/2004 | Johnson et al. | |
| 2005/0044495 A1* | 2/2005 | Lee et al. | 715/533 |
| 2005/0216253 A1 | 9/2005 | Brockett | |
| 2006/0190249 A1* | 8/2006 | Kahn et al. | 704/235 |
| 2007/0240043 A1* | 10/2007 | Fux et al. | 715/533 |

FOREIGN PATENT DOCUMENTS

| | | |
|---|---|---|
| JP | 2005-174212 A | 6/2005 |
| KR | 10-2000-0060727 A | 10/2000 |
| KR | 10-2001-0016679 A | 3/2001 |
| KR | 10-2001-0108615 A | 12/2001 |
| KR | 10-0326936 B1 | 2/2002 |
| KR | 10-2003-0094943 A | 12/2003 |

OTHER PUBLICATIONS

Kang et al. "Automatic Transliteration and Back-Transliteration by Decision-Tree Learning." in Proceedings of 2nd International Conference on Language Resources and Evaluation (LRCE 2000) pp. 1135-1141, 2000.

Covington "An algorithm to align words for historical comparison." Computational Linguistics, 22 (4) pp. 481-496, 1996.

Knight et al. "Machine transliteration." Computational Linguistics 24 (4) pp. 599-612, 1998.

Oh et al. "An English-Korean transliteration model using pronunciation and contextual rule." in Proceedings of 19th International Conference on Computational Linguistics (Coling) 2002.

* cited by examiner

FIG. 7A

| KOREAN SYLLABLE | PHONETIC SYMBOL SUB-STRING 1 | PHONETIC SYMBOL SUB-STRING 2 | PHONETIC SYMBOL SUB-STRING 3 |
|---|---|---|---|
| S1 | ga | gaː | |
| ⋮ | | | |
| Si | sol | soul | |
| ⋮ | | | |
| SN | tʃam | tsam | tʃaːm |

FIG. 7B

| ENGLISH SYLLABLE | PHONETIC SYMBOL SUB-STRING 1 | PHONETIC SYMBOL SUB-STRING 2 | PHONETIC SYMBOL SUB-STRING 3 |
|---|---|---|---|
| a | æ | a | ei |
| ch | tʃ | ʃ | |
| ea | iː | əː | iə |
| ear | iːr | ɛːr | əːr |
| tch | tʃ | | |
| ⋮ | | | |

FIG. 8

| INPUT STRING (801) | REPRESENTATIVE STRING (802) |
|---|---|
| INPUT_STRING 1 | REPRESENTATIVE_STRING 1 |
| INPUT_STRING 2 | REPRESENTATIVE_STRING 1 |
| INPUT_STRING 3 | REPRESENTATIVE_STRING 2 |
| INPUT_STRING 4 | REPRESENTATIVE_STRING 2 |
| ⋮ | ⋮ |

FIG. 9

| REPRESENTATIVE STRING (901) | REPRESENTATIVE PHONETIC SYMBOL STRING (902) |
|---|---|
| REPRESENTATIVE_STRING 1 | bit ʃam — 910 |
| REPRESENTATIVE_STRING 2 | imiza |
| ⋮ | ⋮ |

US 8,117,026 B2

STRING MATCHING METHOD AND SYSTEM USING PHONETIC SYMBOLS AND COMPUTER-READABLE RECORDING MEDIUM STORING COMPUTER PROGRAM FOR EXECUTING THE STRING MATCHING METHOD

CROSS-REFERENCE TO RELATED PATENT APPLICATION

This application claims priority from Korean Patent Application No. 10-2006-0000161, filed on Jan. 2, 2006, in the Korean Intellectual Property Office, the disclosure of which is incorporated herein in its entirety by reference.

BACKGROUND OF THE INVENTION

1. Field of the Invention

Methods and systems consistent with the present invention relate to string matching, and more particularly, to string matching used for processing a plurality of strings that are written in different manners but share the substantially same meaning.

2. Description of the Related Art

In related art application services using metadata of multimedia files (e.g., MPEG Audio Layer-3 (MP3) files), multimedia data often needs to be classified according to information included in the metadata, for example, according to the names of artists who have produced the multimedia data or the genre of the multimedia data. Then, the classification results need to be displayed to users.

Such metadata may include expressions written in various languages, or special characters, such as spaces (' ') and hyphens ('-'). In the case of metadata produced by an ordinary user, strings which share the same meaning but are written in different languages or are written in the same language, but in different forms, may be mistaken as having different meanings.

For example, in an application program for related art MP3 players, music files can be classified according to the names of singers. In this case, a plurality of strings which all refer to the same singer, for example the Korean singer Lee Mija, may be mistaken as referring to different singers depending on whether or not they are written in Korean or English, depending on how they are spelled (e.g., 'Lee Miza' vs. 'Lee Mija'), depending on whether words in the strings are each separated by a space (e.g., 'Lee Mija' vs. 'Lee Mi Ja'), and depending on whether words in the strings are hyphenated (e.g., 'Lee Mija' vs. 'Lee Mi-Ja'), thus causing inconvenience and imposing restrictions on the development of various application services.

SUMMARY OF THE INVENTION

The present invention provides a string matching method and system in which a representative of a plurality of strings which share the substantially same meaning but are written in various manners is searched for, and a computer-readable recording medium storing the string matching method.

According to an aspect of the present invention, there is provided a string matching method of outputting a representative string that matches an input string, the string matching method comprising: converting the input string into one or more phonetic symbol strings with reference to a phonetic symbol mapping table corresponding to a language in which the input string is written and generating a conversion list including the phonetic symbol strings into which the input string is converted, the phonetic symbol mapping table storing a plurality of pieces of mapping information for mapping a string written in the language to one or more phonetic symbol sub-strings; searching a representative list database (DB) for records including the same phonetic symbol strings as the phonetic symbol strings included in the conversion list and generating a candidate list including the identified records, the representative list DB storing a plurality of records, each record comprising a representative string and a representative phonetic symbol string corresponding to the representative string; and determining a representative string included in one of the records included in the candidate list as an output representative string.

The string matching method may further comprising: searching a previous results DB for a string that matches the input string and, if the string that matches the input string exists in the previous results DB, determining a representative string corresponding to the identified string as the output representative string, the previous results DB storing previous string matching results comprising a plurality of strings and a plurality of representative strings respectively corresponding to the strings; and if a record comprising the input string and the output representative string does not exist in the previous results DB, storing the input string and the output representative string in the previous results database.

The converting the input string may comprise removing special characters that are meaningless from the input string.

If the input string may be written in the Korean language, the phonetic symbol mapping table stores a plurality of pieces of mapping information for mapping a Korean syllable to one or more phonetic symbol sub-strings.

If the input string may be written in the English language, the phonetic symbol mapping table stores a plurality of pieces of mapping information for mapping an English syllable to one or more phonetic symbol sub-strings, and the converting the input string comprises: dividing the input string into one or more syllables; and converting the input string into one or more phonetic symbol strings by mapping each of the syllables of the input string to one or more phonetic symbol sub-strings.

The dividing comprises dividing the input string into one or more syllables in such a manner that one or more consecutive consonants, if present, in the input string constitute a syllable, one or more consecutive vowels, if present, in the input string constitute a syllable, and a last consonant, if present, in the input string belongs to the same syllable as a vowel followed by the last consonant.

The string matching method may further comprising respectively giving priority scores to the plurality of pieces of mapping information included in the phonetic symbol mapping table, wherein the converting the input string comprises calculating matching scores of the phonetic symbol strings into which the input string is converted using the priority scores; and determining which of the phonetic symbol strings are to be included in the conversion list with reference to the matching scores.

The string matching method may further comprise altering the priority scores by applying weights to some of the plurality of pieces of mapping information used for mapping the representative string included in the chosen record to a corresponding phonetic symbol string.

The determining the representative string may comprise determining a representative string included in one of the records included in the candidate list as the output representative string based on the matching scores.

According to another aspect of the present invention, there is provided a string matching system for outputting a representative string that matches an input string, the string matching system comprising: a representative list database (DB) which stores a plurality of representative strings and a plurality of representative phonetic symbol strings respectively corresponding to the representative strings; one or more phonetic symbol mapping tables which respectively correspond to one or more languages and each comprises a plurality of pieces of mapping information for mapping a string to one or more phonetic symbol sub-strings; a phonetic symbol string generation unit which converts an input string into one or more phonetic symbol strings with reference to one of the phonetic symbol mapping tables corresponding to a language in which the input string is written and generates a conversion list including the phonetic symbol strings into which the input string is converted; a representative list searching unit which searches the representative list database (DB) for records including the same phonetic symbol strings as the phonetic symbol strings included in the conversion list and generates a candidate list including the identified records; and a representative string determination unit which determines a representative string included in one of the records included in the candidate list as an output representative string.

The string matching system may further comprise: a previous results DB which stores previous string matching results comprising a plurality of strings and a plurality of representative strings respectively corresponding to the strings; a previous results searching unit which searches the previous results DB for a string that matches the input string and, if the string that matches the input string exists in the previous results DB, determines a representative string corresponding to the identified string as the output representative string; and a results storage unit which, if a record comprising the input string and the output representative string does not exist in the previous results DB, stores the input string and the output representative string in the previous results database.

BRIEF DESCRIPTION OF THE DRAWINGS

The above and other aspects of the present invention will become more apparent by describing in detail exemplary embodiments thereof with reference to the attached drawings in which:

FIGS. 7A and 7B are diagrams of a Korean mapping table and an English mapping table, respectively, according to an exemplary embodiment of the present invention;

FIG. 8 is a diagram of a previous results database (DB) according to an exemplary embodiment of the present invention;

FIG. 9 is a diagram of a representative list DB according to an exemplary embodiment of the present invention.

DETAILED DESCRIPTION OF THE EXEMPLARY EMBODIMENTS

The present invention will now be described more fully with reference to the accompanying drawings in which exemplary embodiments of the invention are shown.

Figure 1:
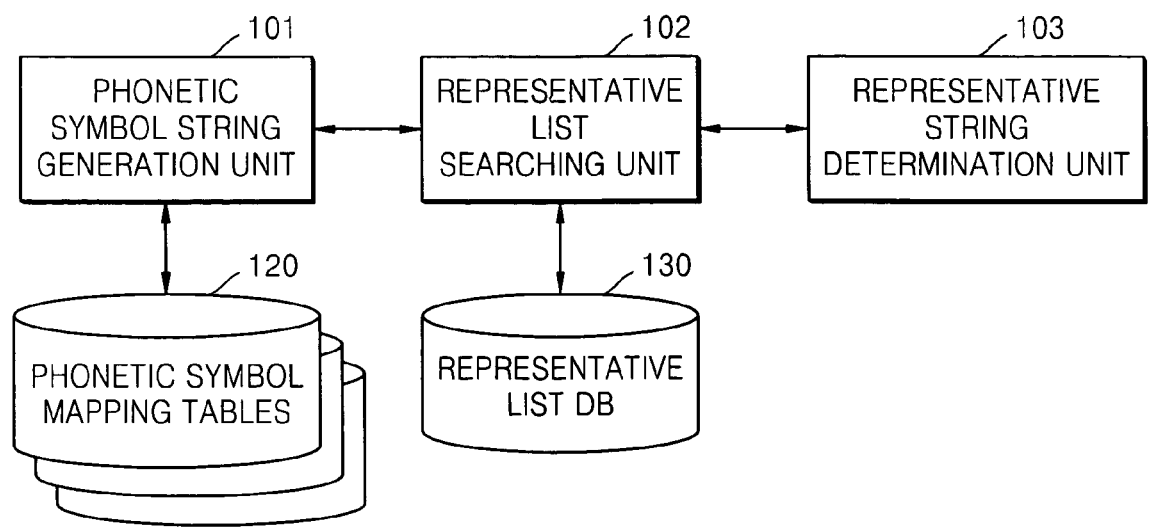
FIG. 1 is a block diagram of a string matching system using phonetic symbols according to an exemplary embodiment of the present invention.

FIG. 1 is a block diagram of a string matching system using phonetic symbols according to an exemplary embodiment of the present invention. Referring to FIG. 1, the string matching system includes a representative list database (DB) 130 which stores information regarding a plurality of representative strings, one or more phonetic symbol mapping tables 120 which store mapping information regarding how a string written in a language can be mapped to a phonetic symbol string, a phonetic symbol string generation unit 101 which generates a conversion list including one or more phonetic symbol strings corresponding to an input string, a representative list searching unit 102 which generates a candidate list including a plurality of representative string candidates based on the conversion list, and a representative string determination unit 103 which chooses one of the representative string candidates as a representative string.

The representative list DB 130 stores a plurality of representative strings and a plurality of phonetic symbol strings respectively corresponding to the representative strings. FIG. 9 is a diagram of an example of the representative list DB 130 illustrated in FIG. 1. The representative list DB 130 stores a plurality of representative strings 901, which may represent the names of a plurality of singers, and a plurality of phonetic symbol strings which respectively correspond to the representative strings 901. A phonetic symbol string is a string of a plurality of phonetic symbol sub-strings respectively corresponding to a plurality of syllables of a string. Thus, a string can be converted into a phonetic symbol string consisting of a plurality of phonetic symbol sub-strings. For example, if a Korean string consisting of a syllable 'bi' and a syllable 'cham' is input, the syllable 'bi' and the syllable 'cham' can be respectively converted into a phonetic symbol sub-string 'bi' and a phonetic symbol sub-string 'tʃam'. Accordingly, a phonetic symbol string 'bitʃam' is generated for the input Korean string.

The phonetic symbol mapping tables 120 store mapping information used to convert a string written in each of a plurality of languages that can be used in the string matching system into a phonetic symbol string. The phonetic symbol mapping tables 120 respectively correspond to the languages that can be used in the string matching system Thus, the number of phonetic symbol mapping tables 120 is substantially identical to the number of languages that can be used in the string matching system, although the present invention is not limited thereto. For example, but not by way of limitation, the phonetic symbol mapping tables 120 may be generated by using the International Phonetic Alphabet (IPA) system.

FIGS. 7A and 7B are exemplary diagrams of a Korean mapping table and an English mapping table, respectively, according to an exemplary embodiment of the present invention.

Referring to FIG. 7A, the Korean mapping table stores mapping information used to map a Korean syllable to one or more phonetic symbol sub-strings. In other words, the Korean mapping table provides one or more phonetic symbol substrings 720 for each of a plurality of Korean symbols 710. A Korean symbol comprises one vowel and one or more consonants. Referring to FIG. 7B, the English mapping table stores mapping information used to map an English syllable to one or more phonetic symbol sub-strings. In other words, the English mapping table provides one or more phonetic symbol sub-strings 740 for each of a plurality of English syllables 730. Referring to FIGS. 7A and 7B, a string is divided into one or more syllables, and the syllables are respectively converted into a plurality of phonetic symbol sub-strings. However, a string can be divided into a plurality of sub-strings which are units of spoken language, other than syllables, without departing from the scope of the invention. For example, the Korean mapping table may store a plurality of phonetic symbols for each of a plurality of Korean vowels and Korean consonants. In this case, an input Korean string is divided into a plurality of phonemes including one or more vowels and one or more consonants, and the phonemes are respectively converted into a plurality of phonetic symbols with reference to the Korean mapping table.

The Korean mapping table illustrated in FIG. 7A and the English mapping table illustrated in FIG. 7B respectively provide up to three phonetic symbol sub-strings for each of the Korean syllables 710 and for each of the English syllables 730. However, the number of phonetic symbol sub-strings respectively provided by the Korean mapping table and the English mapping table for each of the Korean syllables 710 and each of the English syllables 730 is not restricted thereto.

The phonetic symbol string generation unit 101 generates a conversion list including all possible phonetic symbol strings to which an input string can be mapped using the phonetic symbol mapping tables 120. The representative list searching unit 102 searches the representative list DB 130 for records including the substantially same phonetic symbol strings as the phonetic symbol strings included in the conversion list generated by the phonetic symbol string generation unit 101, and generates a candidate list including the identified records. The representative string determination unit 103 chooses a representative string included in one of the records included in the candidate list as an output representative string.

The phonetic symbol string generation unit 101 removes special characters, if any, from the input string and converts the result of the removal into a phonetic symbol string, which may thereby enhance the efficiency of string matching for strings which include special characters. If the input string represents an artist's name, it may include special characters that may be important, and thus must not be removed. Therefore, the phonetic symbol string generation unit 101 may remove special characters such as hyphens ('-') and spaces (' '), if any, from the input string. For example, if the input string is a Korean string that represents the name of a Korean musician and consists of 3 syllables 'Lee', 'Mi', and 'Ja', each separated by a space, the phonetic symbol string generation unit 101 may convert the input string into a Korean string consisting of 3 syllables 'Lee', 'Mi', and 'Ja' with no space between the 3 syllables. If the input string is an English transliteration of the name of the Korean singer, for example, 'Lee Mi-Ja', the phonetic symbol string generation unit 101 may convert the input string into an English string 'LeeMija'. However, special characters other than hyphens and spaces may also be removed from the input string, if necessary. Also, if the input string is an English string, it may be written using both capitalized letters and decapitalized letters. In this case, the input string may be decapitalized and the result of the decapitalization converted into a phonetic symbol string. In this case, the English mapping table stores one or more phonetic symbol strings for each of a plurality of decapitalized English syllables.

Figure 2:
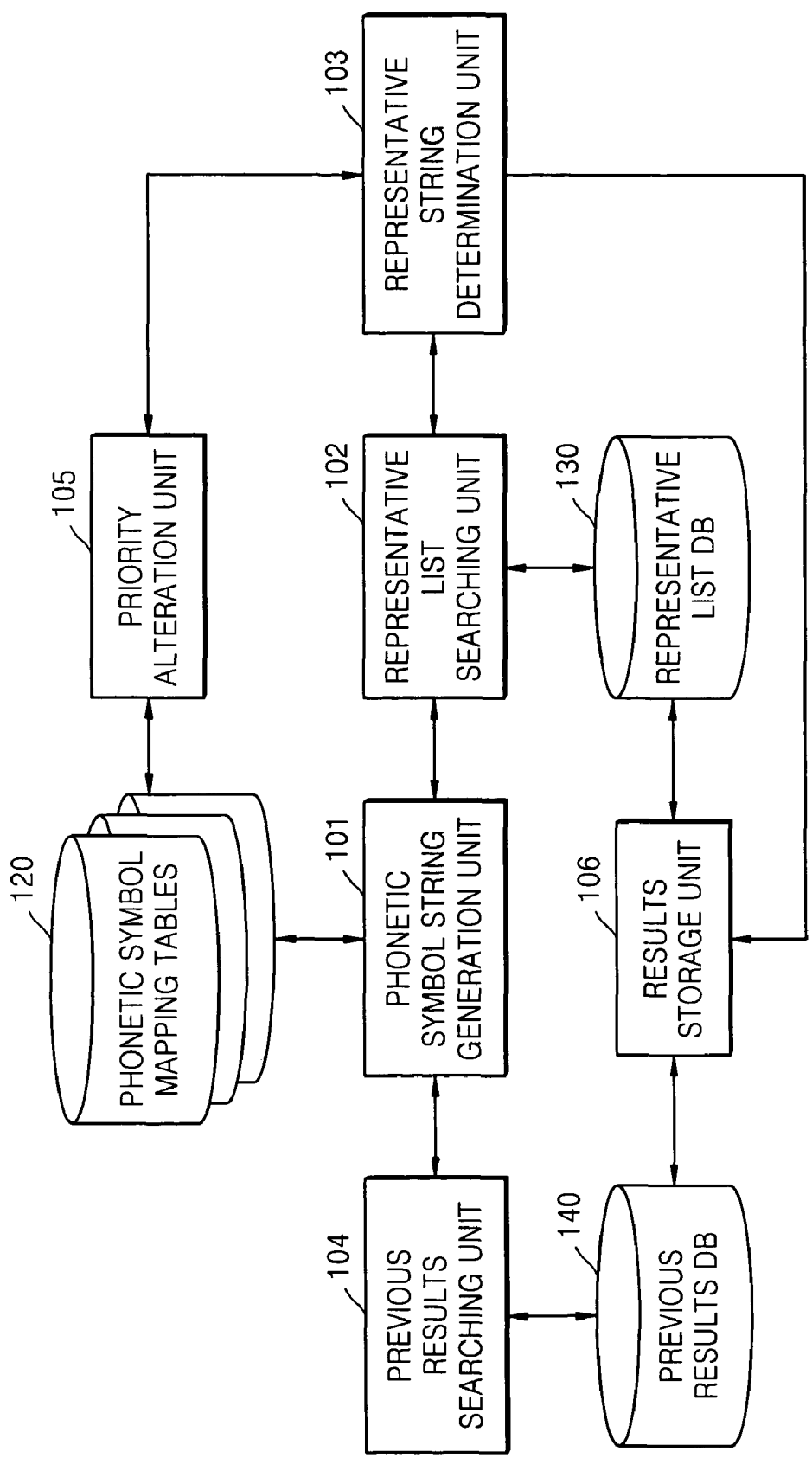
FIG. 2 is a block diagram of a string matching system using phonetic symbols according to another exemplary embodiment of the present invention.

FIG. 2 is a block diagram of a string matching system using phonetic symbols according to another exemplary embodiment of the present invention. The string matching system, like the string matching system illustrated in FIG. 1, includes a representative list DB 130; one or more phonetic symbol mapping tables 120; a phonetic symbol string generation unit 101; a representative list searching unit 102; and a representative string determination unit 103. According to the present exemplary embodiment, the string matching system also includes a previous results DB 140 which stores previous string matching results including a plurality of input strings and a plurality of representative strings respectively corresponding to the input strings, a previous results searching unit 104 which determines whether a representative string for an input string has already been searched for, and a results storage unit 106 which stores string matching results in the previous results DB 140 and the representative list DB 130. According to the present exemplary embodiment, the string matching system also includes a priority alteration unit 105 which alters priority scores given to mapping information included in each of the phonetic symbol mapping tables 120.

FIG. 8 is a diagram of an example of the previous results DB 140 illustrated in FIG. 2 according to an exemplary embodiment of the present invention. The previous results DB stores a plurality of input strings 801 which can be input by a user and are written in various ways and a plurality of representative strings 802 which respectively correspond to the input strings 801. The strings stored in the previous results DB 140 are string matching results accumulated by the results storage unit 106. If a match for an input string exists in the previous results DB 140, there is no need to perform a string matching operation for the input string. The previous results searching unit 104 searches the previous results DB 140 for a match for the input string and determines a representative string corresponding to the identified string as an output representative string, which may thereby enhance the efficiency of string matching.

For example but not by way of limitation, if the input string is an English string INPUT_STRING 4, the previous results searching unit 104 searches the previous results DB 140 for a record including INPUT_STRING 4. Since a record consisting of INPUT_STRING 4 and REPRESENTATIVE_STRING 2 exists in the previous results DB 140, the previous results searching unit 104 determines that the input string has already undergone a string matching operation and outputs REPRESENTATIVE_STRING 2 as a representative string for the input string.

If no match for the input string exists in the previous results DB 140 and thus the input string is subjected to a string matching operation, a string chosen as a representative string for the input string during the string matching operation may be stored in the previous results DB 140 by the results storage unit 106 so that it can be referenced when a same string as the input string is input.

Priority scores may be respectively given to a plurality of pieces of mapping information stored in the phonetic symbol mapping tables 120. In this case, the phonetic symbol string generation unit 101 may calculate matching scores of a plurality of phonetic symbol strings included in a conversion list generated for the input string with reference to the priority scores and generates a conversion list for the input string including only a number of phonetic symbol strings having relatively high matching scores.

The conversion list is input to the representative list searching unit 102. Then the representative list searching unit 102 searches the representative list DB 130 for records including the substantially same phonetic symbol strings as the phonetic symbol strings included in the conversion list and generates a candidate list for the input string including the identified records.

The representative string determination unit 103 may display the candidate list to a user, allow the user to choose one of the records included in the candidate list, and determine a representative string included in the chosen record as an output representative string. If the user chooses none of the records included in the candidate list, the representative string determination unit 103 may determine the input string as an output representative string for the input string. Then the results storage unit 106 stores the input string in the representative list DB 130 as a representative string so that the input string can be referenced in subsequent string matching operations. The results storage unit 106 may store the input string in the representative string DB 130 together with the phonetic symbol string that has the highest matching score among the phonetic symbol strings included in the candidate list for the input string.

The representative string determination unit 103 may automatically determine a representative string corresponding to the phonetic symbol string that has the highest matching score among the phonetic symbol strings included in the candidate list for the input string as an output representative string for the input string without asking the user. Also, if none of the matching scores of the phonetic symbol strings included in the candidate list for the input string exceed a value, the representative string determination unit 103 may determine the input string as an output representative string for the input string. In this case, the results storage unit 106 may store the input string in the representative list DB 130 together with the phonetic symbol string with the highest matching score among the phonetic symbol strings included in the candidate list for the input string.

As described above, priority scores may be respectively given to the plurality of pieces of mapping information stored in the phonetic symbol mapping tables 102. In general, a higher priority score is given to mapping information which maps a given input Korean syllable to a phonetic symbol sub-string which is more likely to match a given input Korean syllable than to mapping information which maps the given input Korean syllable to a phonetic symbol sub-string which is less likely to match the given input Korean syllable. The priority alteration unit 105 alters the priority scores respectively given to the plurality of pieces of mapping information stored in the phonetic symbol mapping tables 102.

For example, if the user chooses a representative string included in one of the records included in the candidate list for the input string as an output representative string for the input string, the priority alteration unit 105 may respectively apply weights to a plurality of pieces of mapping information which are stored in the phonetic symbol mapping tables 102 and used for mapping the chosen representative string to a phonetic symbol string corresponding to the chosen representative string. In this manner, the priority alteration unit 105 can adaptively alter the priority scores respectively given to the plurality of pieces of mapping information stored in the phonetic symbol mapping tables 102 according to string matching results and can thus efficiently optimize the priority scores.

According to the exemplary embodiment, the string matching system may also include an input string extraction unit (not shown) which receives multimedia data including a string and extracts the string from the multimedia data as an input string. In addition, the representative string determination unit 103 may replace the string in the multimedia data with an output representative string, after determining the output representative string for the input string.

Figure 3:
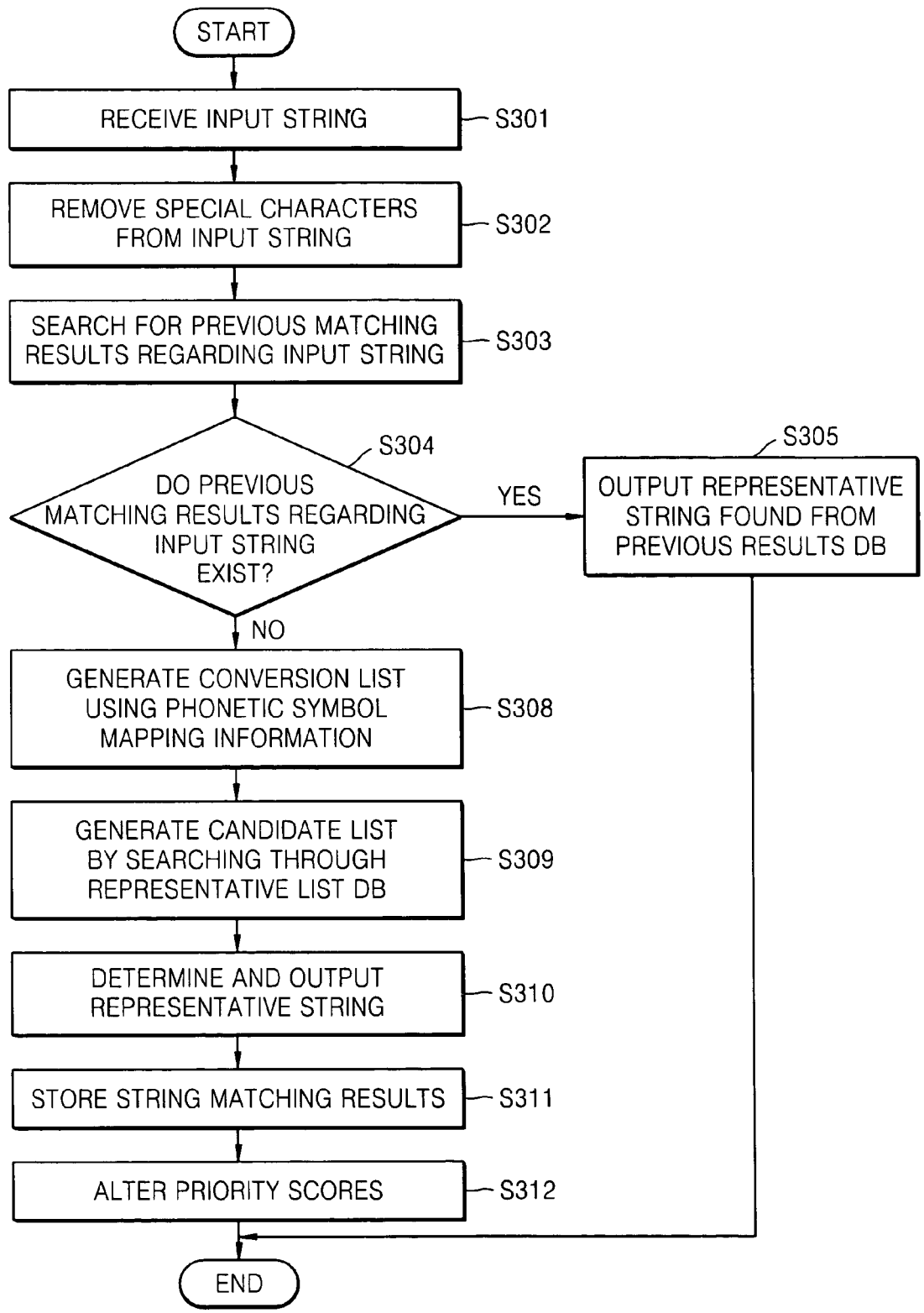
FIG. 3 is a flowchart illustrating a string matching method using phonetic symbols according to an exemplary embodiment of the present invention.
Figure 10:
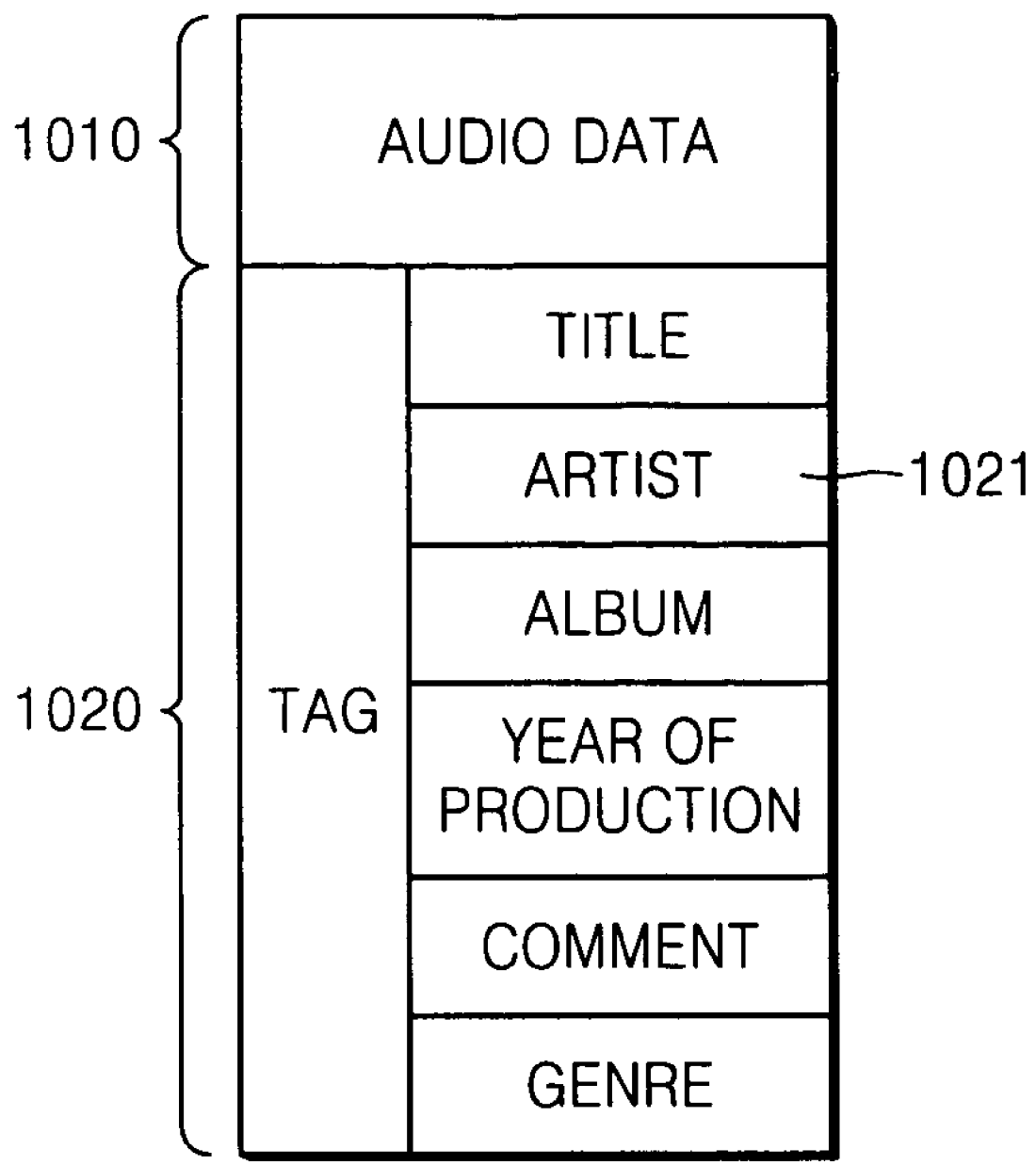
FIG. 10 is a diagram illustrating the format of an MP3 file.

FIG. 3 is a flowchart illustrating a string matching method using phonetic symbols according to an exemplary embodiment of the present invention. In operation S301, an input string is obtained by, for example but not by way of limitation, parsing an MP3 file and extracting the name of an artist included in an ID3 tag. FIG. 10 is a diagram illustrating the format of an MP3 file, including audio data 1010 and a tag 1020. Artist name information 1021 may be extracted from the tag 1020 by parsing the MP3 file as the input string.

In operation S302, special characters (e.g., hyphens '-' and spaces ' '), if present, are removed from the input string. In operation S303, the previous results DB 140 is searched to find a match for the input string. If a representative string that matches the input string is found in the previous results DB 140 in operation S304, the found representative string is determined to be an output representative string in operation S305. Thereafter, the string matching method is terminated.

If a representative string that matches the input string is not found in the previous results DB 140 in operation S304, a conversion list including a plurality of phonetic symbol strings corresponding to the input string is generated with reference to a phonetic symbol mapping table corresponding to a language in which the input string is written in operation S308.

In operation S309, the representative list DB 130 is searched to find matches for the phonetic symbol strings included in the conversion list, and a candidate list is generated based on the results of the searching. The candidate list is a list of records, each comprising a representative phonetic symbol string and a representative string corresponding to the representative phonetic symbol string.

In operation S310, one of the representative strings included in the candidate list is chosen and output as an output representative string. If the input string is a string extracted from a multimedia data, the string in the multimedia data may be replaced with the output representative string obtained in operation S310. For example, instead of the input string, the output representative string obtained in operation S310 may be stored in the location of the artist name information 1021 illustrated in FIG. 10.

In operation S311, the output representative string obtained in operation S310 is stored in the previous results DB 140 together with the input string. In operation S311, if the input string is determined to be an output representative string in operation S310, the input string is stored in the representative list DB 130 as a representative string. The input string may be an output representative string because a user declines to choose any of the records included in the candidate list or because no matches for the phonetic symbol strings included in the conversion list exist in the representative list DB 130 and thus the candidate list is empty, i.e., if the input string is a representative string that is not stored in the representative list DB 130. In operation S311, the phonetic symbol string with a highest matching score among the phonetic symbol strings included in the candidate list or among the phonetic symbol strings included in the conversion list may be stored as a representative phonetic symbol string for the input string.

In operation S312, if a user chooses one of the records in the candidate list so that a representative string included in the chosen record is determined to be the output representative string, priority scores respectively given to a plurality of pieces of mapping information used to convert the input string into the output representative string may be altered, so that the results of the alteration can be referenced in subsequent string matching operations.

Figure 4:
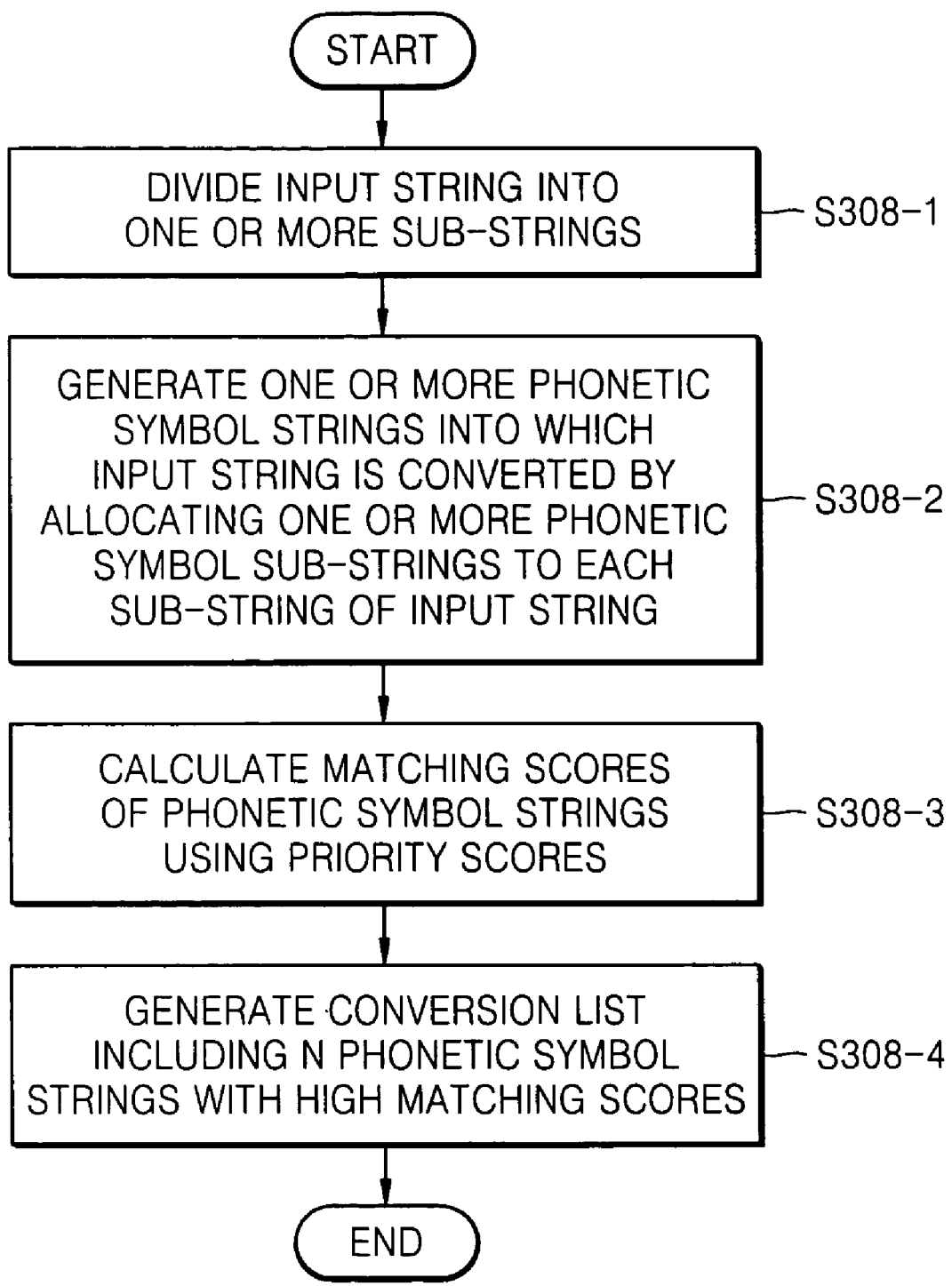
FIG. 4 is a flowchart illustrating the generation of a conversion list according to an exemplary embodiment of the present invention.

FIG. 4 is a flowchart illustrating operation S308 illustrated in FIG. 3, i.e., the generation of a phonetic symbol string according to an exemplary embodiment of the present invention. In operation S308-1, an input string is divided into one or more sub-strings which are units of spoken language. These units of spoken language may differ from one language to another language in which the input string is written. Therefore, a plurality of phonetic symbol mapping tables can be respectively generated for a plurality of languages.

For example, but not by way of limitation, if the input string is a Korean string, the input string may be divided into one or more syllables that are Korean symbols comprising one vowel and one or more consonants. If the input string is an English string, the input string may be divided into one or more syllables. The English input string may be divided into one or more syllables in such a manner that one or more consecutive consonants, if present, in the input string constitute a syllable, one or more consecutive vowels, if present, in the input string constitute a syllable, and a last consonant, if present, in the input string belongs to the same syllable as a vowel followed by the last consonant.

In operation S308-2, one or more phonetic symbol sub-strings are allocated to each of the sub-strings of the input string with reference to a phonetic symbol mapping table corresponding to the language in which the input string is written, thereby converting the input string into one or more phonetic symbol strings. For example, if the input string is a Korean string consisting of a Korean syllable S1 and a Korean syllable Si, a total of 4 phonetic symbol strings, e.g., phonetic symbol strings 'gasol', 'gasoul', 'ga:sol', and 'ga:soul', can be generated by combining two phonetic symbol sub-strings 'ga' and 'ga:' for the Korean syllable S1 and two phonetic symbol sub-strings 'sol' and 'soul' for the Korean syllable Si with reference to the Korean mapping table illustrated in FIG. 7A. For convenience of string matching, a conversion list may be generated to include only a number n of phonetic symbol strings to which the input string can be mapped. For this, priority scores may be respectively given to a plurality of pieces of mapping information included in the phonetic symbol mapping table corresponding to the language in which the input string is written. In operation S308-3, matching scores of the phonetic symbol strings are calculated using the priority scores. In operation S308-4, a conversion list including n of the phonetic symbol strings with high matching scores is generated. More specifically, a priority score may be given to each phonetic symbol sub-string column or each phonetic symbol sub-string of the phonetic symbol mapping table. For example, assuming that priority scores of 10, 7, and 4 points are respectively given to first, second, and third phonetic symbol sub-string columns of the Korean mapping table illustrated in FIG. 7A, matching scores of the phonetic symbol strings 'gasol', 'gasoul', 'ga:sol', and 'ga:soul' may be calculated in operation S308-3 as follows:

Matching Score of 'gasol'=20 points (10 points for 'ga'+10 points for 'sol');

Matching Score of 'gasoul'=17 points (10 points for 'ga'+7 points for 'soul');

Matching Score of 'ga:sol'=17 points (7 points for 'ga:'+10 points for 'sol'); and Matching Score of 'ga:soul'=14 points (7 points for 'ga:'+7 points for 'soul').

If n=3, a conversion list including only 3 of the phonetic symbol strings with the highest matching scores, i.e., 'gasol', 'gasoul', and 'ga:sol', may be generated in operation S308-4. Alternatively, in operation S308-4, a conversion list including a plurality of the phonetic symbol strings whose matching scores exceed a value may be generated.

Figure 5:
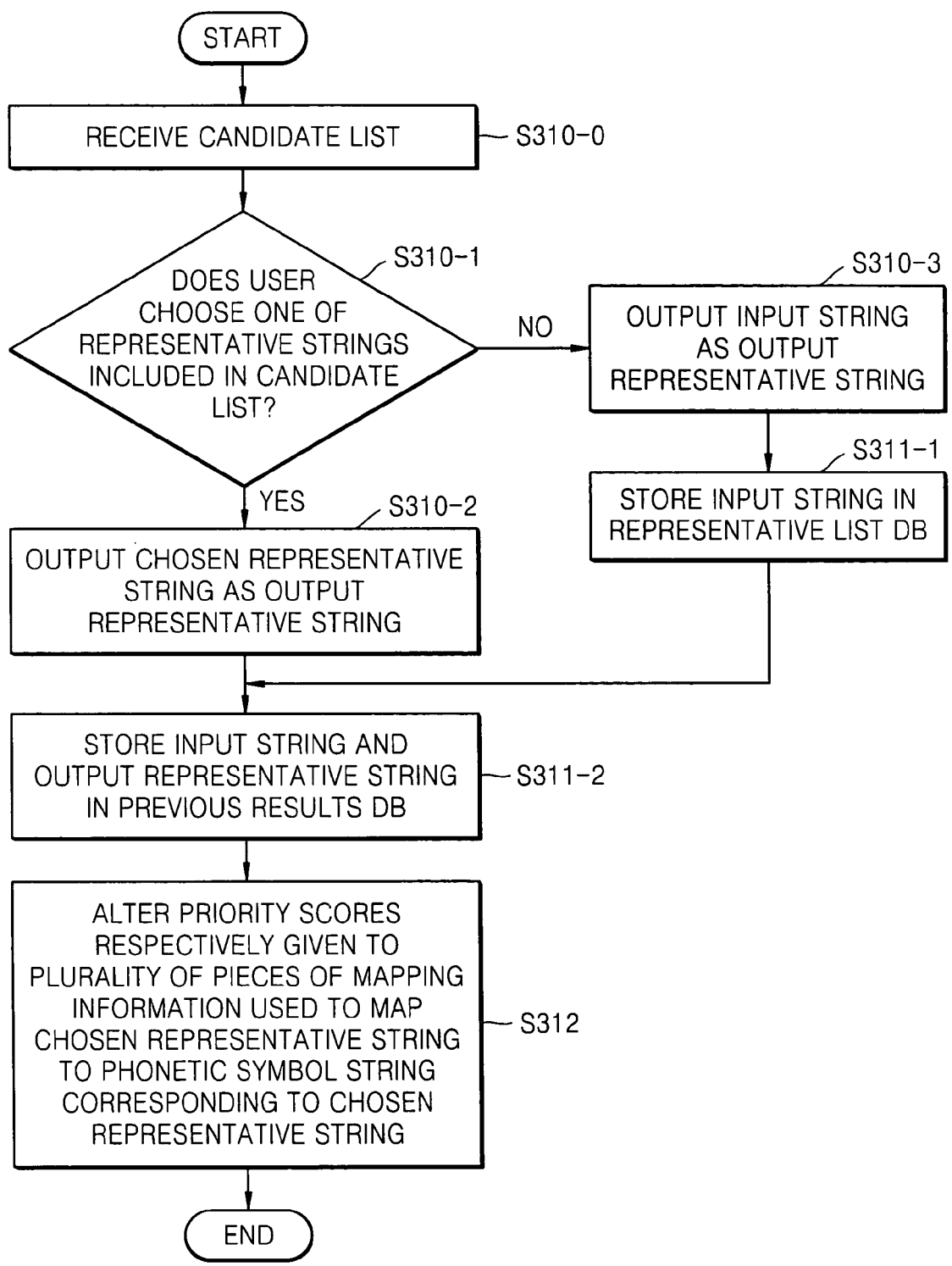
FIG. 5 is a flowchart illustrating a method of determining one of a plurality of representative strings as an output representative string based on user selection according to an exemplary embodiment of the present invention.

FIG. 5 is a flowchart illustrating operation S310 to S312 illustrated in FIG. 3 according to an exemplary embodiment of the present invention, i.e., a method of determining and storing one of a plurality of representative strings as an output representative based on user selection according to an exemplary embodiment of the present invention. In operation S310-0, a candidate list generated in operation S309 illustrated in FIG. 3 is received. For example, if an input string is a Korean string consisting of 2 syllables 'ru' and 'ra', a conversion list including a plurality of phonetic symbol strings 'rula', 'ru:la', and 'lula' is generated in operation S308 illustrated in FIG. 3. If matching scores of the phonetic symbol strings 'rula', 'ru:la', and 'lula' are respectively 20 points, 17 points, and 14 points, a candidate list including a plurality of records, i.e., a first record comprising a first representative string and the phonetic symbol string 'rula' and a second record comprising a second representative string and the phonetic symbol string 'ru:la', may be generated in operation S309 illustrated in FIG. 3. In operation S310-2, if a user chooses one of the records included in the candidate list, e.g., the first record, in operation S310-1, the first representative string is determined as an output representative string for the input string. In operation S311-2, the input string and the output representative string obtained in operation S310-2 are stored in the previous results DB 130 as a new record so that the record can be referenced in subsequent string matching operations.

If the user declines to choose any of the records included in the candidate list and wants to use the input string as it is as an output representative string in operation S310-1, the input string is determined as an output representative string in operation S310-3 and is thus stored in the representative list DB 130 together with the phonetic symbol string 'rula' having the highest matching score in operation S311-1. Thereafter, in operation S311-2, the input string and the output representative string obtained in operation S310-3 are stored in the previous results DB 140 as a new record so that the record can be referenced in subsequent string matching operations. In operation S312, since the output representative string obtained either in operation S310-2 or S310-3 is based on user selection, priority scores respectively given to a plurality of pieces of mapping information used for mapping the input string to the output representative string are altered by, for example, respectively applying weights to the plurality of pieces of mapping information so that the priorities thereamong can be appropriately updated to reflect the user's preferences.

Figure 6:
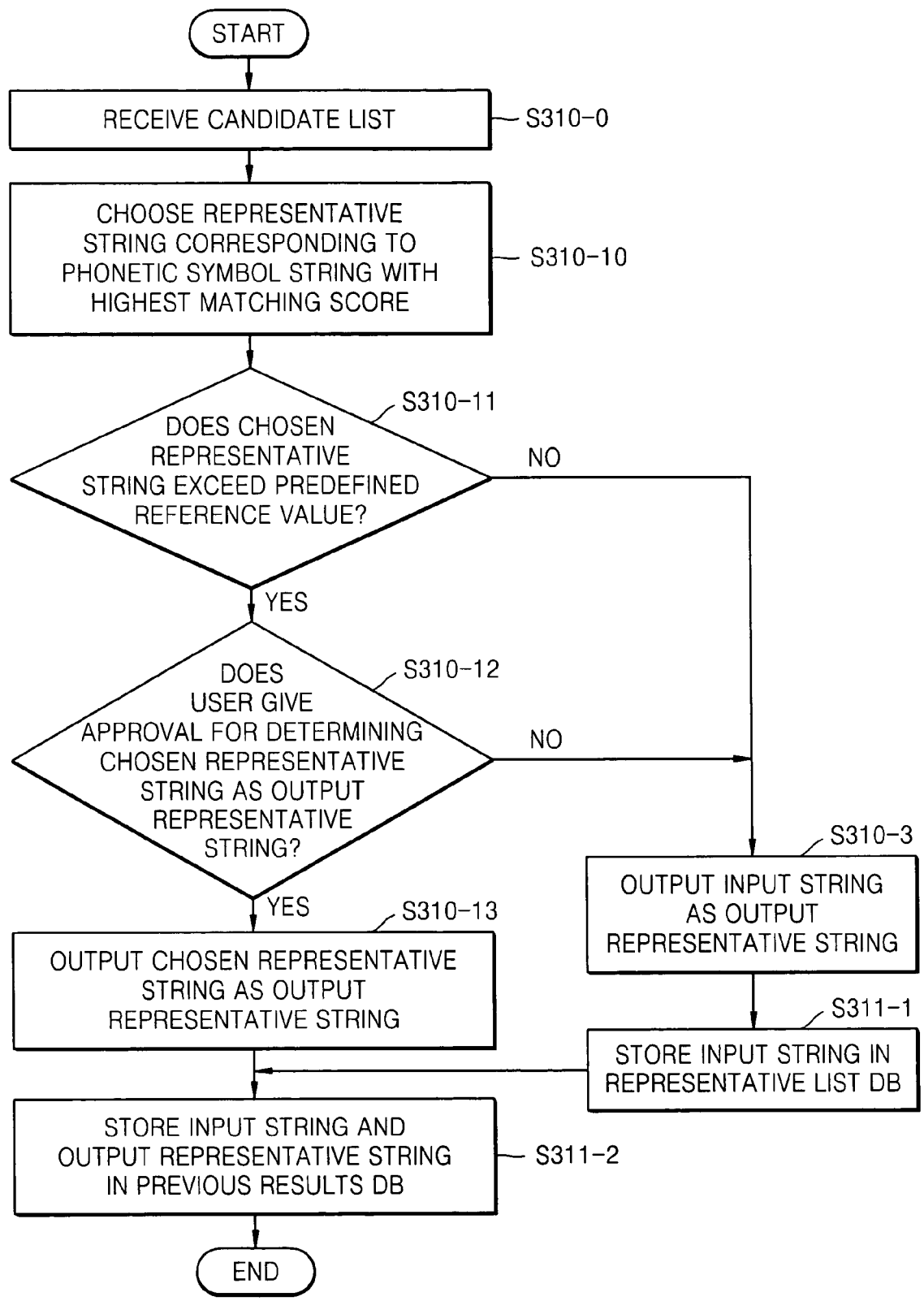
FIG. 6 is a flowchart illustrating a method of determining one of a plurality of representative strings as an output representative string based on matching scores of the representative strings according to an exemplary embodiment of the present invention.

FIG. 6 is a flowchart illustrating operation S310 and S311 illustrated in FIG. 3 according to another exemplary embodiment of the present invention, i.e., a method of determining and storing one of a plurality of representative strings as an output representative string based on matching scores of the representative strings according to an exemplary embodiment of the present invention. In operation S310-0, a candidate list generated in operation S309 illustrated in FIG. 3 is received. In operation S310-10, if a service currently being provided to a user does not require a user selection process, a representative string corresponding to a phonetic symbol string having a highest matching score among a plurality of phonetic symbol strings included in the candidate list is chosen as an output representative string. In operation S310-11, it is determined whether the chosen representative string exceeds a reference value. In operation S310-3, if the chosen representative string is determined in operation S310-11 not to exceed the reference value, an input string is determined and output as an output representative string in operation S310-3 and is then stored in the representative list DB 130 in operation S311-1, which can thereby enhance the reliability of string matching results.

On the other hand, in operation S310-12, if the chosen representative string is determined in operation S310-11 to exceed the reference value, it is determined whether the user gives approval for determining the chosen representative string as an output representative string. In operation S310-13, if it is determined in operation S310-12 that the user gives approval for determining the chosen representative string as an output representative string, the chosen representative string is determined and output as an output representative string. On the other hand, if it is determined in operation S310-12 that the user gives no approval for determining the chosen representative string as an output representative string, the method proceeds to operation S310-3. In operation S311-2, the input string and the output representative string obtained in operation S310-3 or S310-13 are stored in the previous results database 140.

The exemplary embodiments may be implemented as computer-readable code written on a computer-readable recording medium.

In the exemplary embodiments disclosed herein, the term "unit" as used herein with respect to structural units 101-106 may be understood to include, but not be limited to, structures as would be understood by those skilled in the art. For example, but not by way of limitation, the structure may include a circuit or other equivalent structure therefore without departing from the scope of the invention.

As described above, according to the exemplary embodiments of the present invention, it is possible to search for a representative string for a plurality of strings which are written in different languages and/or in different manners but share the substantially same meaning. Therefore, the exemplary embodiments are suitable for services providing string-based multimedia data classifications. For example, referring to the representative list DB illustrated in FIG. 9, a plurality of strings which share the same meaning can be mapped to a single representative string, e.g., REPRESENTATIVE_STRING 1, regardless of whether they are written in Korean or English, how they are spelled, or whether words in the strings are each separated by a space. In addition, it is possible but not necessary to enhance the precision of string matching regardless of an input language by using phonetic symbols. Moreover, it is possible to optimize string matching results by adaptively altering priority scores respectively given to a plurality of pieces of mapping information used to produce the string matching results.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A string matching method of outputting a representative string that matches an input string, the string matching method comprising:
    converting the input string into one or more phonetic symbol strings with reference to a phonetic symbol mapping table corresponding to a language of the input string, and generating a conversion list including the one or more phonetic symbol strings, the phonetic symbol mapping table storing mapping information for mapping a string written in the language to one or more phonetic symbol sub-strings;
    searching, by a string matching apparatus, a representative list database (DB) for records including the one or more phonetic symbol strings included in the conversion list, and generating a candidate list including the records, the representative list DB storing the records, each of the records comprising a representative string and a representative phonetic symbol string corresponding to the representative string; and
    determining a representative string in one of the records of the candidate list as an output representative string,
    wherein the converting the input string comprises allocating the one or more phonetic symbol sub-strings to each sub-string of the input string with reference to the phonetic symbol mapping table for each sub-string of the input string, and generating the one or more phonetic symbol strings according to one or more combinations of the allocated one or more phonetic symbol sub-strings.

2. The string matching method of claim 1, wherein:
    the phonetic symbol mapping table comprises:
        first mapping information comprising a first sub-string of the input string and one or more first phonetic symbol sub-strings, the first mapping information mapping the first sub-string to the one or more first phonetic symbol sub-strings, and
        second mapping information comprising a second sub-string of the input string and one or more second phonetic symbol sub-strings, the second mapping information mapping the second sub-string to the one or more second phonetic symbol sub-strings; and
    the generating the one or more phonetic symbol strings comprises generating a first phonetic symbol string according to a first combination of the one or more first phonetic symbol sub-strings with the one or more second phonetic symbol sub-strings, and generating a second phonetic symbol string according to a second combination, different from the first combination, of the one or more first phonetic symbol sub-strings with the one or more second phonetic symbol sub-strings.

3. The string matching method of claim 1 further comprising:
    searching a previous results DB for a string that matches the input string, and if the string that matches the input string exists in the previous results DB, determining a representative string corresponding to the identified string as the output representative string, the previous results DB storing previous string matching results comprising a plurality of strings and a plurality of corresponding representative strings; and
    if the string that matches the input string does not exist in the previous results DB, storing the input string and the output representative string in the previous results database.

4. The string matching method of claim 3, wherein the converting the input string into the one or more phonetic symbol strings comprises removing special characters from the input string.

5. The string matching method of claim 4, wherein the special characters comprise at least one of a hyphen '-' and a space ' '.

6. The string matching method of claim 3, wherein, if the input string is written in Korean language, the mapping information comprises mapping information for mapping a Korean syllable to the one or more phonetic symbol sub-strings.

7. The string matching method of claim 3, wherein, if the input string is written in English language, the mapping information comprises mapping information for mapping an English syllable to the one or more phonetic symbol sub-strings, and
the allocating the one or more phonetic symbol sub-strings comprises:
dividing the input string into one or more syllables; and
converting the input string into the one or more phonetic symbol strings by mapping each of the one or more syllables of the input string to the one or more phonetic symbol sub-strings, and
wherein the one or more syllables are the one or more sub-strings of the input string.

8. The string matching method of claim 7, wherein the dividing comprises dividing the input string into the one or more syllables such that one or more consecutive consonants in the input string constitute a syllable, one or more consecutive vowels in the input string constitute a syllable, and a last consonant in the input string belongs to a same syllable as a vowel followed by a previous consonant.

9. The string matching method of claim 3 further comprising respectively giving priority scores to the mapping information included in the phonetic symbol mapping table,
wherein the converting the input string further comprises calculating matching scores of the phonetic symbol strings into which the input string is converted using the priority scores; and
determining which of the phonetic symbol strings to include in the conversion list with reference to the matching scores.

10. The string matching method of claim 9, wherein the determining which of the phonetic symbol strings to include in the conversion list with reference to the matching scores comprises determining only a number of the one or more phonetic symbol strings into which the input string is converted and which have high matching scores to include in the conversion list.

11. The string matching method of claim 9, wherein the determining which of the phonetic symbol strings to include in the conversion list with reference to the matching scores comprises determining a plurality of phonetic symbol strings whose matching scores exceed a value among the one or more phonetic symbol strings into which the input string is converted to include in the conversion list.

12. The string matching method of claim 9, wherein the determining the representative string comprises determining a representative string included in one of the records included in the candidate list as the output representative string based on the matching scores.

13. The string matching method of claim 12, wherein the determining the representative string further comprises:
if none of the phonetic symbol strings included in the candidate list exceed a reference value, determining the input string as the output representative string, and, if the input string is determined as the output representative string, the storing the input string and the output representative string in the previous results database further comprises storing the input string in the representative list DB together with the phonetic symbol string with a highest matching score among the phonetic symbol strings included in the candidate list.

14. The string matching method of claim 9, wherein the determining the representative string comprises determining a representative string corresponding to the phonetic symbol string with a highest matching score among the phonetic symbol strings included in the candidate list as the output representative string.

15. The string matching method of claim 9, further comprising receiving multimedia data including the input string and extracting the input string from the multimedia data.

16. The string matching method of claim 15, wherein the multimedia data is an MP3 file, and the extraction of the input string comprises extracting an artist name included in an ID3 tag of the MP3 file by parsing the MP3 file.

17. The string matching method of claim 16, wherein the determining the representative string further comprises replacing the input string in the multimedia data with the output representative string.

18. The string matching method of claim 3, wherein the determining the representative string comprises determining a representative string included in a record chosen from the candidate list by a user as the output representative string.

19. The string matching method of claim 3, wherein the determining the representative string comprises, if the user chooses none of the records included in the candidate list, determining the input string as the output representative string, and, if the input string is determined as the output representative string, and
the storing the input string and the output representative string in the previous results database comprises storing the input string in the representative list DB together with the phonetic symbol string with a highest matching score among the phonetic symbol strings included in the candidate list.

20. The string matching method of claim 18 further comprising altering priority scores given to the mapping information included in the phonetic symbol mapping table by applying weights to at least a part of the mapping information used for mapping the representative string included in the chosen record to a corresponding phonetic symbol string.

21. A computer-readable recording medium storing a computer program for executing a string matching method of outputting a representative string that matches an input string, the string matching method comprising:
converting the input string into one or more phonetic symbol strings with reference to a phonetic symbol mapping table corresponding to a language of the input string, and generating a conversion list including the phonetic symbol strings, the phonetic symbol mapping table storing mapping information for mapping a string written in the language to a phonetic symbol string;
searching a representative list database (DB) for records including the one or more phonetic symbol strings as the phonetic symbol strings included in the conversion list and generating a candidate list including the identified records, the representative list DB storing the records, each of the records comprising a representative string and a representative phonetic symbol string corresponding to the representative string; and
determining a representative string in one of the records of the candidate list as an output representative string,
wherein the converting the input string comprises allocating the one or more phonetic symbol sub-strings to each sub-string of the input string with reference to the phonetic symbol mapping table for each sub-string of the input string, and generating the one or more phonetic symbol strings according to one or more combinations of the allocated one or more phonetic symbol sub-strings.

22. A string matching system for outputting a representative string that matches an input string, the string matching system comprising:
- a representative list database (DB) which stores a plurality of representative strings and a plurality of representative phonetic symbol strings that respectively correspond to the representative strings;
- one or more phonetic symbol mapping tables which respectively correspond to one or more languages and each comprises mapping information for mapping a string to one or more phonetic symbol sub-strings;
- a phonetic symbol string generation unit which converts an input string into one or more phonetic symbol strings with reference to one of the phonetic symbol mapping tables corresponding to a language in which the input string is written and generates a conversion list including the phonetic symbol strings into which the input string is converted;
- a representative list searching unit which searches the representative list database (DB) for records including the same phonetic symbol strings as the phonetic symbol strings included in the conversion list and generates a candidate list including the identified records; and
- a representative string determination unit which determines a representative string included in one of the records included in the candidate list as an output representative string,
- wherein the phonetic symbol string generation unit converts the input string by allocating the one or more phonetic symbol sub-strings to each sub-string of the input string with reference to the phonetic symbol mapping table for each sub-string of the input string, and generating the one or more phonetic symbol strings according to one or more combinations of the allocated one or more phonetic symbol sub-strings.

23. The string matching system of claim 22 further comprising:
- a previous results DB which stores previous string matching results comprising a plurality of strings and the plurality of representative strings respectively corresponding to the strings;
- a previous results searching unit which searches the previous results DB for a string that matches the input string and, if the string that matches the input string exists in the previous results DB, determines the representative string corresponding to the identified string as the output representative string; and
- a results storage unit which, if the string that matches the input string does not exist in the previous results DB, stores the input string and the output representative string in the previous results database.

24. The string matching system of claim 23, wherein the phonetic symbol mapping tables comprise a Korean language mapping table storing the mapping information for mapping a Korean syllable to one or more phonetic symbol sub-strings.

25. The string matching system of claim 23, wherein the phonetic symbol mapping tables comprise an English language mapping table storing the mapping information for mapping an English syllable to one or more phonetic symbol sub-strings.

26. The string matching system of claim 23, wherein priority scores are respectively given to the plurality of pieces of mapping information stored in each of the phonetic symbol mapping tables, and the phonetic symbol string generation unit calculates matching scores of the phonetic symbol strings into which the input string is converted using the priority scores and determines which of the phonetic symbol strings are to be included in the conversion list with reference to the matching scores.

27. The string matching system of claim 26, wherein the representative string determination unit determines the representative string included in one of the records included in the candidate list as the output representative string based on the matching scores.

28. The string matching system of claim 27 further comprising an input string extraction unit which receives multimedia data including the input string and extracts the input string from the multimedia data.

29. The string matching system of claim 28, wherein the representative string determination unit replaces the input string in the multimedia data with the output representative string.

30. The string matching system of claim 23, wherein the representative string determination unit determines a representative string included in a record chosen from the candidate list by a user as the output representative string.

31. The string matching system of claim 30 further comprising a priority alteration unit which, if the representative string included in the chosen record is determined as the output representative string, alters priority scores given to the mapping information included in the phonetic symbol mapping table by applying weights to at least a part of the mapping information used for mapping the representative string included in the chosen record to the corresponding phonetic symbol string.

* * * * *